(12) United States Patent
Takahashi

(10) Patent No.: US 7,864,265 B2
(45) Date of Patent: Jan. 4, 2011

(54) LAMP HOLDER, AND BACKLIGHT DEVICE AND LIQUID CRYSTAL DISPLAY DEVICE USING SUCH LAMP HOLDER

(75) Inventor: Yuhji Takahashi, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 473 days.

(21) Appl. No.: 12/090,895

(22) PCT Filed: Aug. 25, 2006

(86) PCT No.: PCT/JP2006/316676

§ 371 (c)(1),
(2), (4) Date: Apr. 21, 2008

(87) PCT Pub. No.: WO2007/055059

PCT Pub. Date: May 18, 2007

(65) Prior Publication Data

US 2009/0231510 A1    Sep. 17, 2009

(30) Foreign Application Priority Data

Nov. 8, 2005    (JP) .............................. 2005-323327

(51) Int. Cl.
G02F 1/1335    (2006.01)
G02F 1/1333    (2006.01)
F21V 7/04    (2006.01)
F21V 21/00    (2006.01)

(52) U.S. Cl. .............................. 349/61; 349/60; 349/70; 349/65; 362/634; 362/217.14

(58) Field of Classification Search .................... 349/61, 349/65, 60, 70; 362/634, 217.14
See application file for complete search history.

(56) References Cited

U.S. PATENT DOCUMENTS

| 5,477,423 | A | 12/1995 | Fredriksz et al. |
| 7,086,774 | B2 | 8/2006 | Katsuda et al. |
| 7,261,434 | B2 * | 8/2007 | Miyamoto .................. 362/218 |
| 7,360,943 | B2 * | 4/2008 | Cha et al. .................. 362/633 |
| 7,527,419 | B2 * | 5/2009 | Choi et al. .................. 362/634 |
| 2004/0179152 | A1 | 9/2004 | Nishikai et al. |
| 2007/0053177 | A1 * | 3/2007 | Choi et al. .................... 362/97 |

FOREIGN PATENT DOCUMENTS

| JP | 06-308489 A | 11/1994 |
| JP | 10-048427 A | 2/1998 |
| JP | 10-096900 A | 4/1998 |
| JP | 2002-100233 A | 4/2002 |

OTHER PUBLICATIONS

Official communication issued in the International Application No. PCT/JP2006/316676, mailed on Oct. 31, 2006.

* cited by examiner

*Primary Examiner*—Mike Qi
(74) *Attorney, Agent, or Firm*—Keating & Bennett, LLP

(57) ABSTRACT

In a lamp holder for holding an end section of a fluorescent lamp, a long groove is formed on a plane facing a light entrance plane of a light guide plate, in a same direction as the longitudinal direction of the light entrance plane, and a first hole is formed on a plane vertical to the light entrance plane, at a position below the bottom surface of the long groove, for inserting the end section of the fluorescent lamp.

7 Claims, 4 Drawing Sheets

LAMP HOLDER, AND BACKLIGHT DEVICE AND LIQUID CRYSTAL DISPLAY DEVICE USING SUCH LAMP HOLDER

BACKGROUND OF THE INVENTION

1. Field of the Invention

The present invention relates to a lamp holder, and more specifically to a lamp holder for use in a backlight device of a side light type.

2. Description of the Related Art

In a non-self-emitting display device such as a liquid crystal display device, a so-called backlight device is typically arranged which irradiates a display panel from behind. This backlight device is of a direct light type, side light type, planar light source type, or the like. For a small-sized display device, in terms of slimming-down and weight saving, those of the side light type are currently widely used.

The backlight of this side light type irradiates a back surface of the display panel by making light from a light source incident on a side surface of a light guide plate and exit as a flat light source from a front surface thereof by making the light travel in the light guide plate in a manner so as to be totally reflected therein while causing part of the light to be reflected by a reflective sheet fitted on a back surface of the light guide plate or by changing the propagation direction of the light with a medium border surface and a pattern formed on the light guide plate.

In recent years, with increases in the size of a display device, a tube of a fluorescent lamp (linear light source) for use in such a side light type backlight device has been elongated. In addition, a smaller inside tube diameter of the fluorescent lamp provides higher light emission efficiency; therefore, the tube of the fluorescent lamp has been not only elongated but also slimmed down. Such tube elongation and slimming-down has resulted in very low mechanical strength of the fluorescent lamp. Thus, when a light guide plate built in the backlight device is displaced by vibration, impact, and the like, a force is added from the light guide plate to a lamp holder holding the both ends of the fluorescent lamp arranged near the side surface of the light guide plate, thereby bending the fluorescent lamp, which may cause brightness non-uniformity or breakage of the fluorescent lamp.

Thus, various technologies for fixing a light guide plate to prevent its displacement have been suggested. For example, JP-A-H6-308489 suggests a technology of fixing a light guide plate in a case by providing a depression or a projection on a plane other than a light entrance plane of the light guide plate, also providing a projection or a depression at a position of the case facing this, and engaging the projection and the depression with each other. In addition, JP-A-H10-48427 suggests a technology of positioning and fixing a light guide plate by providing a stopper on a light exit plane side at the leading end facing a light entrance plane of the light guide plate or a plane side facing the light exit plane side. Further, JP-A-2004-247285 suggests a technology of fitting near a light entrance plane locking means for impeding movement of a light guide plate.

However, as in the technologies suggested in JP-A-H6-308489 and JP-A-H10-48427, with a method of preventing displacement of a light guide plate by providing a depression or a projection to the light guide plate, brightness non-uniformity in illumination occurs when, for example, a prism light guide plate is used. More specifically, as shown in FIG. 7, forming projections 111a and 111b on both side surfaces of a light guide plate 11', forming engaging grooves 131a and 131b in a case 13', then fitting the light guide plate 11' to the case 13' with the projections 111a and 111b of the light guide plate 11' being engaged with the engaging grooves 131a and 131b of the case 13' permits preventing displacement of the light guide plate 11' caused by vibration and impact. However, since the projections 111a and 111b project from the light guide plate 11', light reflects and diffuses at boundaries between the light guide plate 11' and the projections 111a and 111b. This results in a problem that a bright line and a dark line occur near the roots of the projections 111a and 111b, causing non-uniformity in the brightness of illumination light and further decreasing the light emission efficiency. Although the projections are formed on the side surface of the light guide plate 11' of FIG. 7, brightness non-uniformity is similarly observed in a case where projections are formed on the back side of the light guide plate 11'.

With a technology of separately fitting to a case (chassis) locking means for impeding movement of a light guide plate, such as the one suggested in JP-A-2004-247285, the number of components and assembly operations increase, leading to a prediction that the productivity deteriorates.

SUMMARY OF THE INVENTION

In order to overcome the problems described above, preferred embodiments of the present invention provide a lamp holder which prevents displacement of a light guide plate caused by vibration, impact, and the like and also which prevents breakage of a fluorescent lamp arranged near the side surface of the light guide plate.

In addition, preferred embodiments of the present invention provide a backlight device and a liquid crystal display device which prevent displacement of a light guide plate caused by vibration, impact, and the like which are free from brightness non-uniformity and from breakage of a fluorescent lamp, and which are excellent in durability.

According to a preferred embodiment of the present invention, a lamp holder holding an end section of a linear light source arranged at a side surface of a light guide plate is provided. In the lamp holder, on a plane facing a light entrance plane of the light guide plate, a long groove is formed in a same direction as a longitudinal direction of the light entrance plane, and a first hole into which the end section of the linear light source is inserted is formed in a plane vertical to the light entrance plane at a position below a bottom surface of the long groove.

Moreover, according to a preferred embodiment of the present invention, a lamp holder holding an end section of a linear light source arranged at a side surface of a light guide plate is provided. In the lamp holder, a second hole into which the end section of the linear light source is inserted is formed on a plane vertical to the light entrance plane, and a cross section of the second hole in a direction vertical to a central axis is shaped into a polygon, one vertex of which is directed toward the light entrance plane of the light guide plate. Here, in terms of reducing a force added from the lamp holder to the linear light source, it is preferable that a cross section of the second hole has a triangular or substantially triangular shape.

Further, according to a preferred embodiment of the present invention, a backlight device includes: a light guide plate making light incident from a side surface thereof exit as illumination light from a main surface thereof, a linear light source arranged so as to oppose at least one side surface of the light guide plate; and a lamp holder fitted to both ends of the linear light source and holding the linear light source. In the backlight device, as the lamp holder, any of the lamp holders described above is used.

Furthermore, according to a preferred embodiment of the present invention, a liquid crystal display device includes: a liquid crystal panel; and a backlight device irradiating the liquid crystal panel from behind. In the liquid crystal display device, as the backlight device, the backlight device described above is used.

In a lamp holder according to a preferred embodiment of the present invention, on a plane facing a light entrance plane of a light guide plate, a long groove is formed in a same direction as a longitudinal direction of the light entrance plane, and a first hole into which an end section of a linear light source is inserted is formed on a plane vertical to the light entrance plane at a position below a bottom surface of the long groove. Thus, even when the light guide plate is displaced and makes contact with the lamp holder, a force received by the lamp holder from the light guide plate is dispersed by the long groove, so that only a small force is added to the linear light source. As a result, breakage of even a linear light source with an elongated and slimmed-down tube is effectively prevented.

In a lamp holder according to another preferred embodiment of the present invention, a second hole into which an end section of a linear light source is inserted is formed on a plane vertical to a light entrance plane of a light guide plate, and a cross section of the second hole in a direction vertical to a central axis is shaped into a polygon, one vertex of which is directed toward the light entrance plane. Thus, even when the light guide plate is displaced and makes contact with the lamp holder, a force received by the lamp holder from the light guide plate is dispersed by the second hole, so that, as described above, only a small force is added to the linear light source. As a result, breakage of the linear light source is effectively prevented. If a cross section of the second hole has a triangular or substantially triangular shape, a force added from the lamp holder to the linear light source can be efficiently reduced.

In a backlight device and liquid crystal display device according to a preferred embodiment of the present invention, as a lamp holder supporting both end sections of a fluorescent tube, the one described above is used. Thus, breakage of the fluorescent tube and brightness non-uniformity are prevented.

These and other features, elements, steps, advantages, and characteristics of the present invention will be apparent from the following description of preferred embodiments with reference to the accompanying drawings.

DETAILED DESCRIPTION OF PREFERRED EMBODIMENTS

Hereinafter, a lamp holder, a backlight device, and a liquid crystal display device according to preferred embodiments of the present invention will be described, based on the drawings. The present invention is not at all limited to these preferred embodiments.

Figure 1:
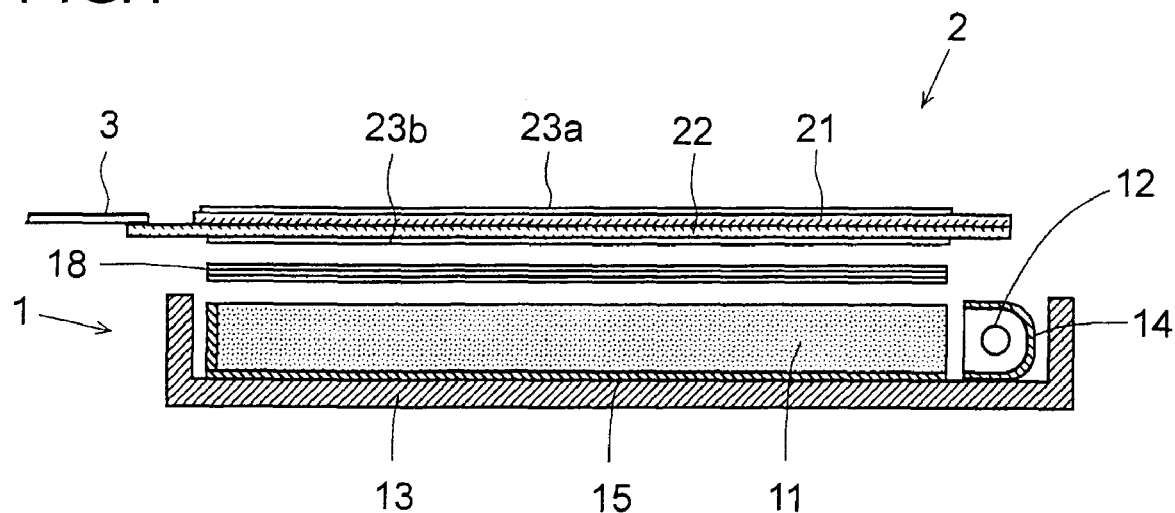
FIG. 1 is a schematic sectional view showing one example of a liquid crystal display device including a backlight device according to a preferred embodiment of the present invention.

FIG. 1 shows a schematic configuration diagram showing one example of the liquid crystal display device including the backlight device according to a preferred embodiment of the present invention. The liquid crystal display device of FIG. 1 includes a backlight 1 and a liquid crystal panel 2. The backlight 1 has a light guide plate 11, which is a plate-like body of an oblong shape in a plan view, which has a back surface thereof fitted with a reflective sheet 15, and which is stored in a case (housing) 13 preferably having a rectangular or substantially rectangular shape having the top thereof opening. On the front surface of the light guide plate 11, a plurality of optical sheets 18 are arranged. Near one side end plane (light entrance plane) of the light guide plate 11, a fluorescent lamp (linear light source) 12 is arranged. The surrounding of the fluorescent lamp 12 is covered with a reflective case 14 so that light from the fluorescent lamp 12 can be efficiently made incident on the light entrance plane of the light guide plate 11.

On the other hand, the liquid crystal panel 2 is formed of a pair of opposing glass substrates 21 and 22 spaced apart from each other with a liquid crystal (not shown) enclosed therebetween. The outer edge section of the glass substrate 22 extends more outward than the glass substrate 21. Formed on this extending portion are a large number of electrode terminals (not shown) for applying voltage to pixel electrodes formed on the front surface of the glass substrate 22. On the front and back surfaces of the liquid crystal panel 2, deflection plates 23a and 23b are fitted. The electrode terminals formed on the glass substrate 22 are connected to a circuit board, not shown, via an FPC (Flexible Printed Circuit) 3.

Light emitted from the fluorescent lamp 12 enters the light guide plate 11 from the light entrance plane, and travels inside the light guide plate 11 while repeating its reflection. Specifically, the light guide plate 11 has a larger refractive index than the air, and thus the light travels inside the light guide plate while totally reflected on the front surface of the light guide plate 11. On the other hand, on the back surface of the light guide plate 11, the reflective sheet 15 is fitted, which directs the light upward along a light exit plane. As the reflective sheet 15, any conventional one, such as a sheet-type member of metal or a white PET film, can be used. The light exiting from the light guide plate 11 irradiates the back surface of the liquid crystal panel 2 through the optical sheets 18.

Figure 2:
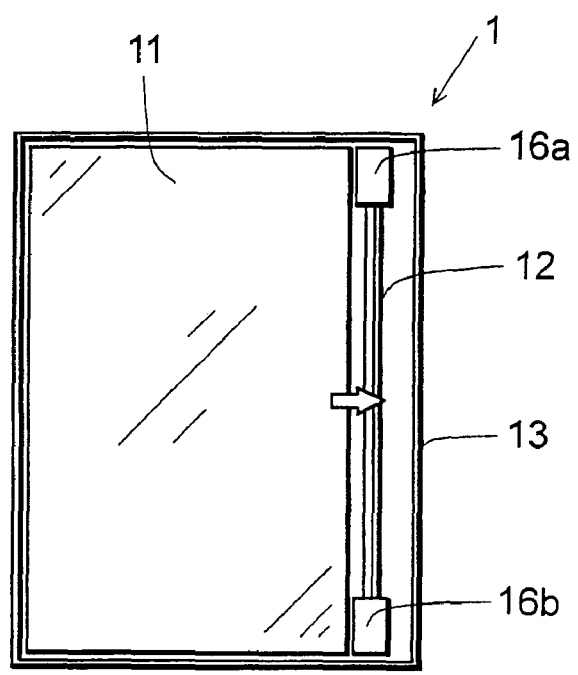
FIG. 2 is an example of a plan view of the backlight device according to a preferred embodiment of the present invention.
Figure 3:
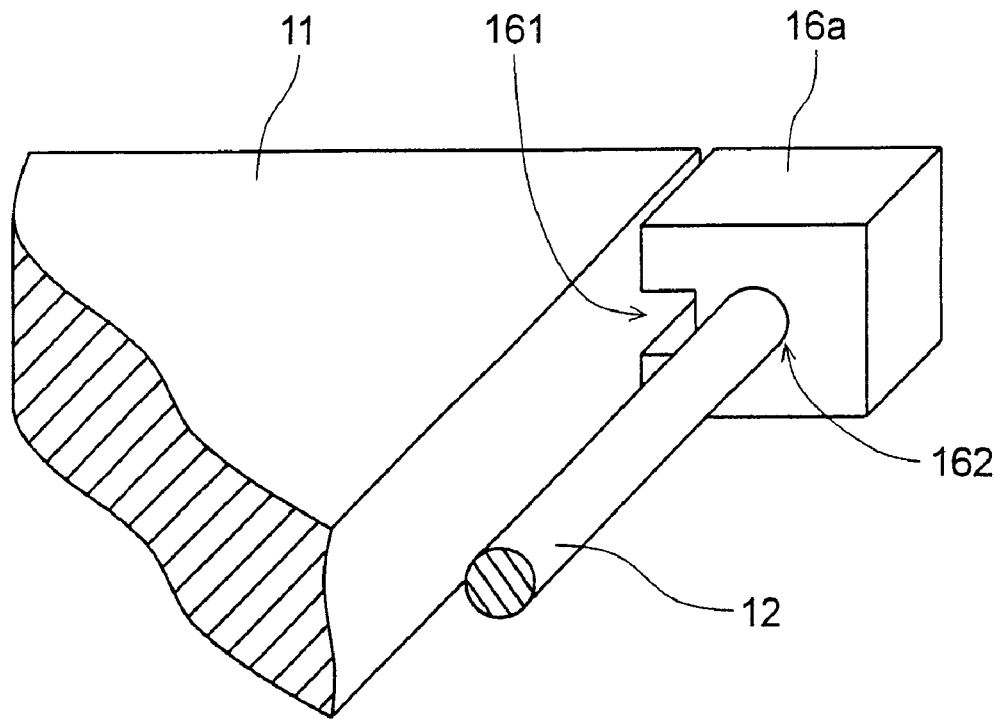
FIG. 3 is a partially enlarged perspective view of the backlight device of FIG. 2.

FIG. 2 shows a plan view of the backlight 1 having the light guide plate 11 and the fluorescent lamp 12 arranged therein. For the purpose of better understanding of a fitting condition of the fluorescent lamp 12 and lamp holders 16a and 16b, the plan view is provided with the reflective case 14 removed. The fluorescent lamp 12 is fitted with and held by, at both end sections thereof, a pair of lamp holders 16a and 16b. Displacement of the light guide plate 11 to the right as viewed in the figure causes the light guide plate 11 to collide with the lamp holders 16a and 16b, thereby applying a force to the lamp holders. FIG. 3 shows a perspective view showing how the lamp holder 16a, the fluorescent lamp 12, and the light guide plate 11 are arranged.

As is clear from FIG. 3, the lamp holder 16a preferably has a rectangular or substantially rectangular shape, has a long groove 161 formed on a plane thereof facing the light entrance plane in the same direction as the longitudinal direction of the light entrance plane, and has a first hole 162 formed on a plane vertical to the light entrance plane at a position below the bottom surface of the long groove 161. An end section of the fluorescent lamp 12 is inserted in this first hole 162. The lamp holder 16b holding the other end section of the fluorescent lamp 12 has the same structure as that of the lamp holder 16a. In this figure, a small gap is provided between the lamp holder 16a and the light guide plate 11, but the lamp holder 16a may be in contact with the light guide plate 11.

Figure 4:
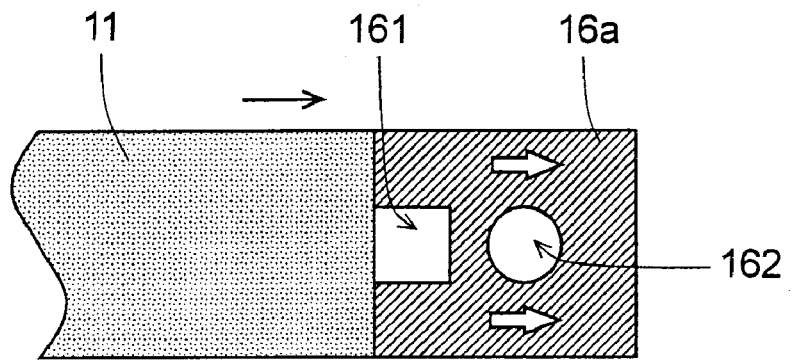
FIG. 4 is a schematic view showing how an impact force is transmitted inside a lamp holder according to a first preferred embodiment of the present invention.

As shown in FIG. 4, when the light guide plate 11 is displaced and collides with the lamp holder 16a in such a condition, an impact force (shown by an arrow in the figure) of the light guide plate 11 is transmitted from the projecting sections on the both sides of the long groove 161 in the direction opposite to the light guide plate. Moreover, as described later, the lamp holder 16a is made up of a elastic material, and thus the impact force of the light guide plate 11 is also absorbed by deformation of the lamp holder 16a. What is important here is that, due to the formation of the long groove 161 on the lamp holder 16a, when the light guide plate 11 is displaced and collides with the lamp holder 16a, much of its impact force is not transmitted to a portion below the bottom surface of the long groove 161. This prevents deformation and breakage of the fluorescent lamp 12 inserted in the first hole 162 formed below the bottom surface of the long groove 161.

The shape of the long groove 161 formed on the lamp holder 16 is not specifically limited. The width of the long groove 161 is preferably equal to or larger than the diameter of the fluorescent lamp 12, and its depth is also preferably equal to or larger than the diameter of the fluorescent lamp 12. The long groove 161 formed on the lamp holder 16 may be fabricated by metallic molding simultaneously with fabrication of the lamp holder 16, or may be formed by cutting after the fabrication of the lamp holder 16 having a rectangular or a substantially rectangular shape.

The shape of the first hole 162 formed in the lamp holder 16 is not specifically limited as long as it can hold the fluorescent lamp 12, and thus may be shaped into a polygon other than a circle in cross section. When the lamp holder 16 is made up of an elastic material, it is preferable that the shortest diameter of the first hole 162 be equal to or smaller than the diameter of the fluorescent lamp 12 so that the fluorescent lamp 12 is held by the first hole 162.

As a material of the lamp holder 16, in terms of absorbing impact, an elastic material is preferable, and additionally, an insulating material is preferable since it holds the end section of the fluorescent lamp to which high voltage is applied. Examples of such materials include: silicone resin, urethane resin, and so on.

Figure 5:
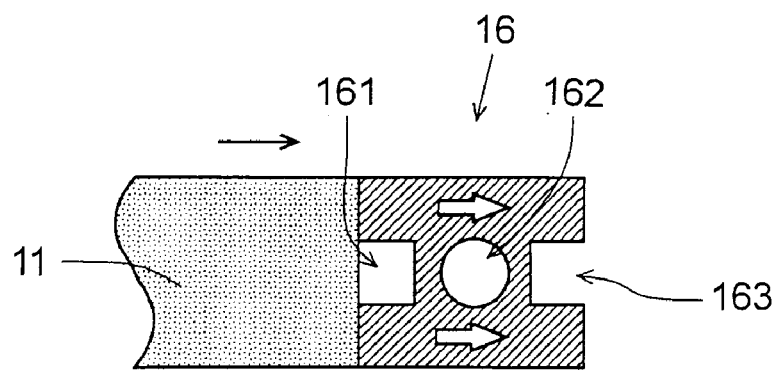
FIG. 5 is a schematic view showing another preferred embodiment of the lamp holder according to the present invention.

FIG. 5 shows another preferred embodiment of the lamp holder according to the present invention. The lamp holder 16 of FIG. 5 has a long groove 163 formed on a plane facing a plane where a long groove 161 is formed. Forming the long grooves 161 and 163 in the direction in which an impact force is transmitted in this manner makes it difficult for the force to be transmitted to a first hole 162, which permits even more effectively preventing breakage of a fluorescent lamp 12 held.

Figure 6A:
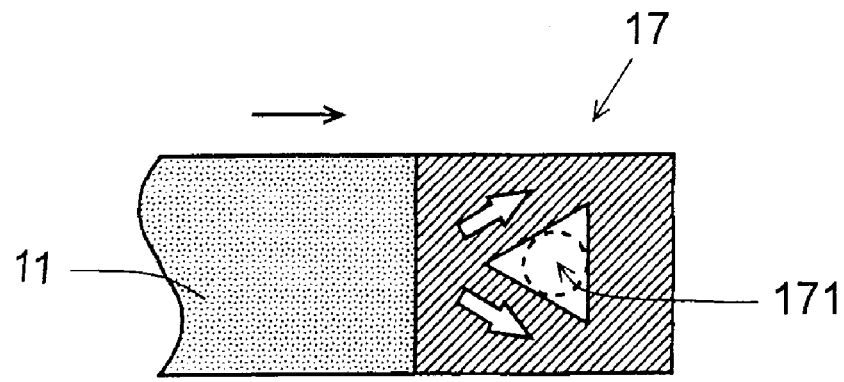
FIGS. 6A-6C are schematic views showing examples of a further preferred embodiment of a lamp holder according to the present invention.
Figure 6B:
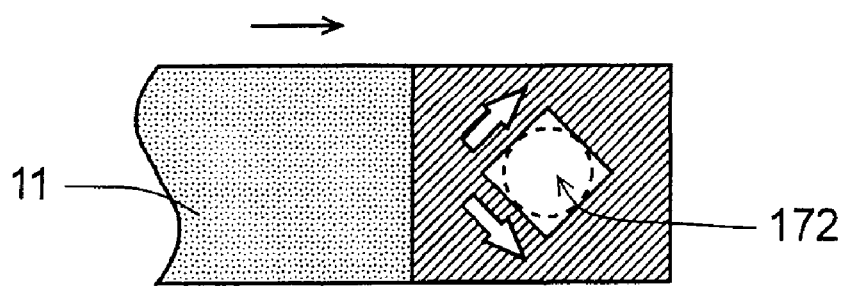
Figure 6C:
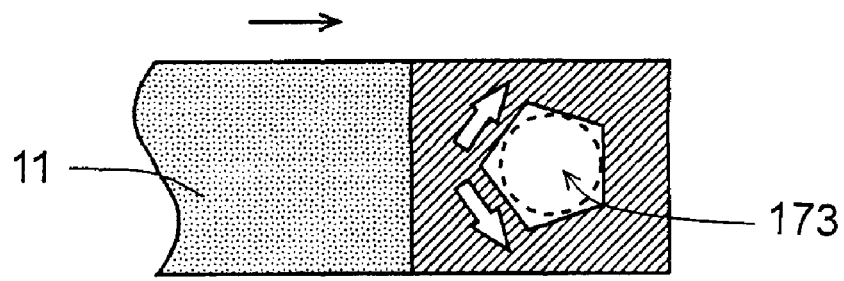
Figure 7:
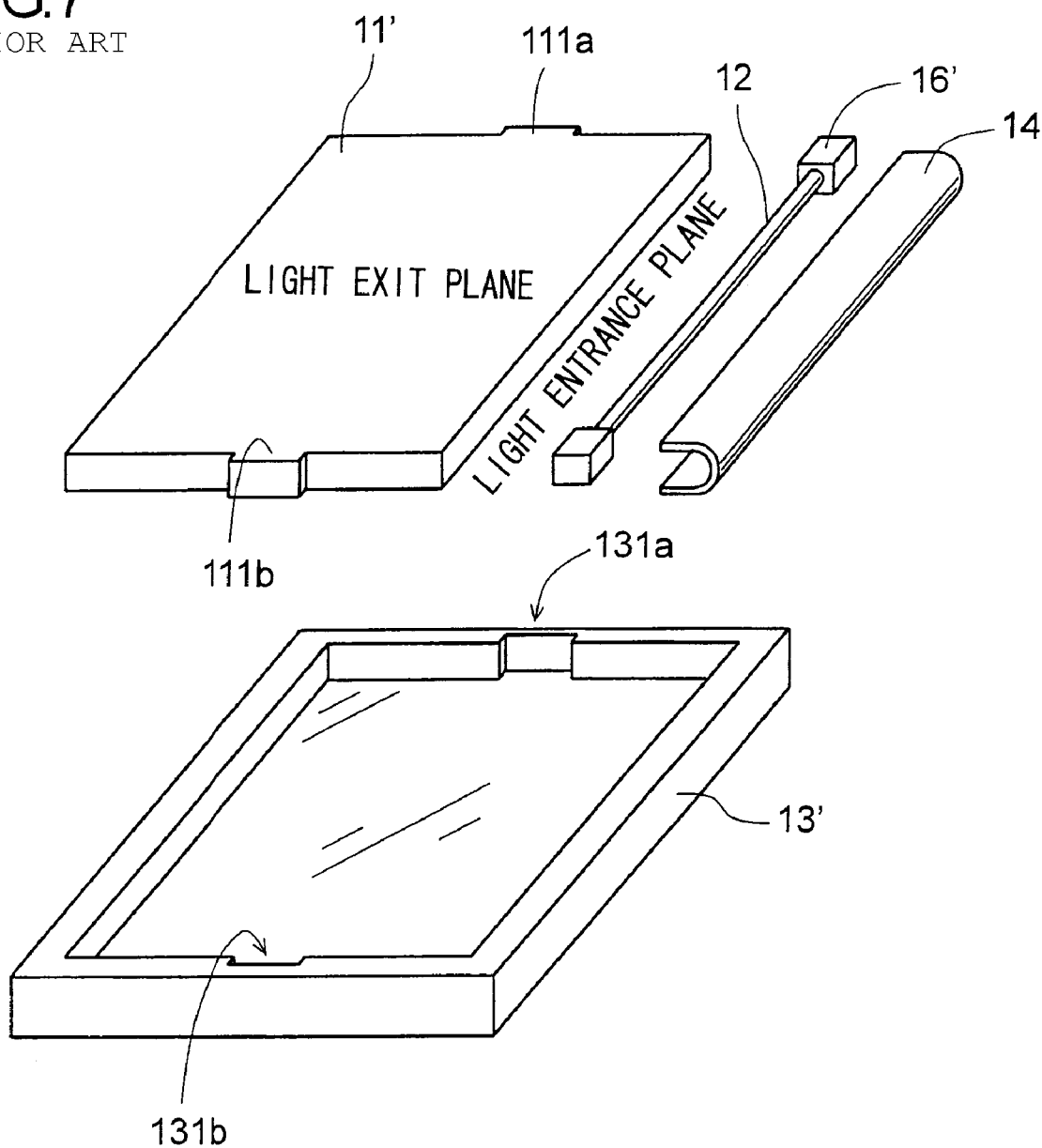
FIG. 7 is a perspective view of a conventional backlight device.

Next, a lamp holder according to another preferred embodiment of the present invention will be described. The lamp holder according to the present preferred embodiment differs from the lamp holder according to the above-described preferred embodiment of the present invention in a point that instead of forming a long groove on a plane facing a light entrance plane, a hole formed in a lamp holder is shaped into a polygon in cross section, one vertex of which is directed toward the light entrance plane of a light guide plate. FIGS. 6A-6C show examples of the present preferred embodiment of the lamp holder according to the present invention. Broken lines in the figure show the position of a fluorescent lamp. The lamp holder 17 of FIG. 6A has a second hole 171 having a triangular or substantially triangular cross section, one vertex of which is directed toward the light entrance plane. An impact force generated by collision of the light guide plate is transmitted, as shown by an arrow in the figure, in such a manner as to be divided from the aforementioned vertex of the triangle along two oblique sides, whereby the impact force transmitted to the second hole 171 is greatly reduced. This effectively prevents the breakage of the fluorescent lamp 12.

FIGS. 6B and 6C are vertical sectional views showing another preferred embodiment of the lamp holder according to the present invention. The lamp holder of FIG. 6B has a second hole 172 having a square or substantially square shape in cross section. The lamp holder of FIG. 6C has a second hole 173 having a pentagon or substantially pentagon shape in cross section. Even when the second hole is formed into either of such shapes, as described above, an impact force transmitted to the second hole is reduced, thereby effectively preventing the breakage of the fluorescent lamp 12.

The material of the lamp holder according to the preferred embodiments of FIGS. 6A-6C may be the same as that used in the first preferred embodiment described above.

In the preferred embodiments described above, the first and second holes may penetrate through the lamp holder or may not penetrate therethrough.

A lamp holder according to various preferred embodiments of the present invention can be used in a side-light type backlight device. Even when a light guide plate is displaced and makes contact with the lamp holder, a force received from the light guide plate is dispersed by a long groove or a second hole of a polygonal shape, thus effectively preventing breakage of a linear light source with a tube that has been elongated and slimmed following upsizing and light emission efficiency improvement of a display device.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A lamp holder holding an end section of a linear light source arranged at a side surface of a light guide plate; wherein
    on a plane facing a light entrance plane of the light guide plate, an elongated groove is arranged to extend in a same direction as a longitudinal direction of the light entrance plane; and
    a hole into which the end section of the linear light source is inserted is formed in a plane vertical to the light entrance plane at a position below a bottom surface of the elongated groove.

2. A backlight device comprising:
    a light guide plate arranged to cause light incident from a side surface thereof exit as illumination light from a main surface thereof;
    a linear light source arranged so as to oppose at least one side surface of the light guide plate; and
    a lamp holder according to claim 1 fitted to both ends of the linear light source and holding the linear light source.

3. A liquid crystal display device comprising:

a liquid crystal panel; and a backlight device according to claim 2 arranged to irradiate the liquid crystal panel from behind.

4. A lamp holder holding an end section of a linear light source arranged at a side surface of a light guide plate; wherein a hole into which the end section of the linear light source is inserted is located in a plane vertical to a light entrance plane; and a cross section of the hole in a direction vertical to a central axis has a substantially polygonal shape, one vertex of which is directed toward the light entrance plane of the light guide plate.

5. The lamp holder according to claim 4, wherein a cross section of the hole has a substantially triangular shape.

6. A backlight device comprising:

a light guide plate arranged to cause light incident from a side surface thereof exit as illumination light from a main surface thereof;

a linear light source arranged so as to oppose at least one side surface of the light guide plate; and a lamp holder according to claim 4 fitted to both ends of the linear light source and holding the linear light source.

7. A liquid crystal display device comprising:

a liquid crystal panel; and a backlight device according to claim 6 arranged to irradiate the liquid crystal panel from behind.

* * * * *